No. 787,977. PATENTED APR. 25, 1905.
W. F. EDWARDS.
PLOW ATTACHMENT.
APPLICATION FILED AUG. 2, 1904.
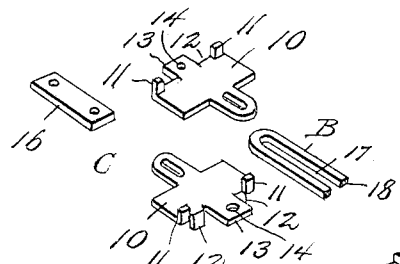
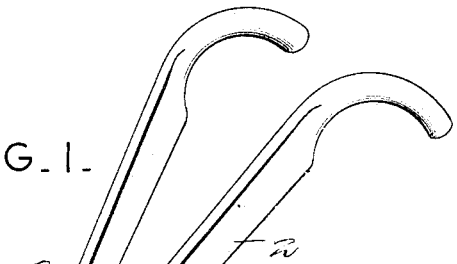
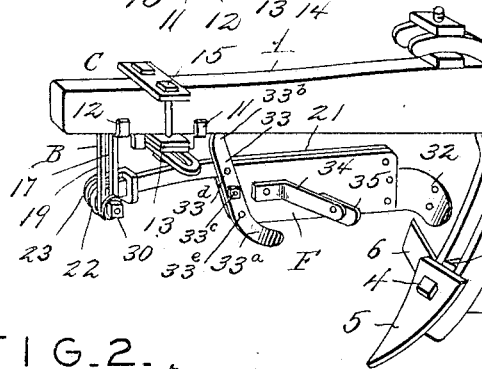
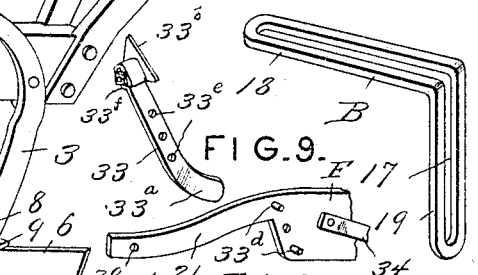
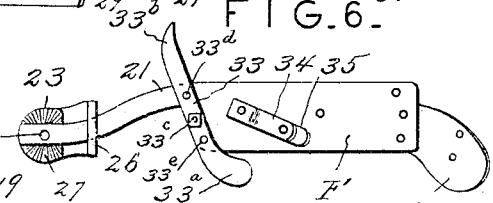
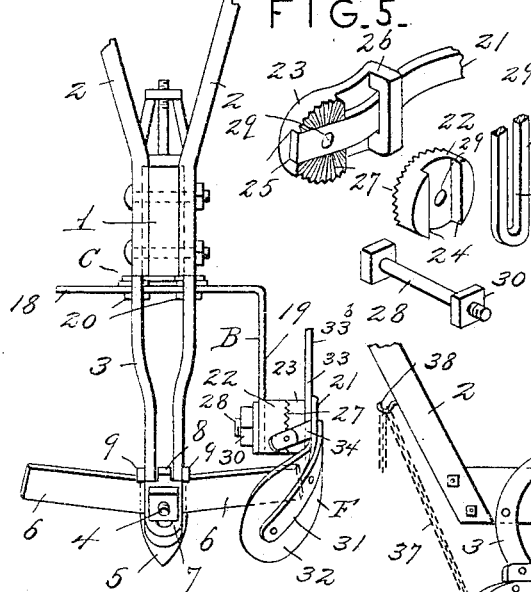
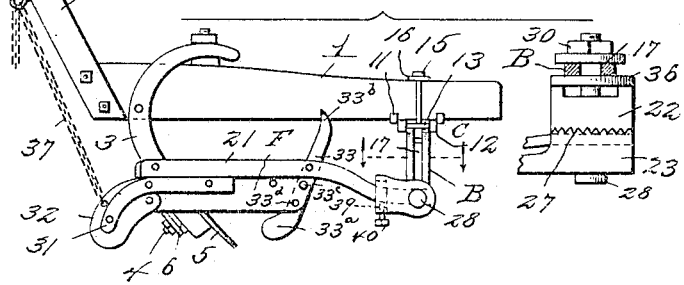
Witnesses
William F. Edwards, Inventor.
by Ashow & Co.
Attorneys No. 787,977.

Patented April 25, 1905.

UNITED STATES PATENT OFFICE.

WILLIAM F. EDWARDS, OF COVINGTON, GEORGIA.

PLOW ATTACHMENT.

SPECIFICATION forming part of Letters Patent No. 787,977, dated April 25, 1905.

Application filed August 2, 1904. Serial No. 219,199.

*To all whom it may concern:*

Be it known that I, WILLIAM F. EDWARDS, a citizen of the United States, residing at Covington, in the county of Newton and State of Georgia, have invented a new and useful Plow Attachment, of which the following is a specification.

This invention relates to plows, and especially to that class of plows which are used for cultivating between rows of growing plants; and it has for its object to provide for such plows an attachment in the nature of a fender capable of being attached to or connected with a plow-beam adjustably, so that it may be set for operating in the desired manner or in any manner which may be necessitated by the stage of growth of the plants operated upon, said fender attachment being provided with a surplus-growth cutter and with wings or guards to prevent clods and stones from rolling back upon the plants.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is thereby made to the precise structural details therein exhibited, but that the right is reserved to any changes, alterations, and modifications to which recourse may be had without departing from the spirit or sacrificing the advantages of the invention.

In said drawings, Figure 1 is a perspective view of an ordinary plow equipped with the improved attachment. Fig. 2 is a rear elevation of the same. Fig. 3 is a perspective view, on a larger scale, of the clamping device, whereby the front end of the attachment is connected with the plow-beam. Fig. 4 is a detail view of the holding-bracket. Fig. 5 is a detail perspective view, on an enlarged scale, of the clamping device, whereby the fender-beam is connected with the holding-bracket. Fig. 6 is a side elevation showing the inner side of the fender. Fig. 7 is a side elevation showing the outer side of the fender and the beam carrying the same. Fig. 8 is a detail view illustrating a modification. Fig. 9 is a detail view showing the front end of the fender and the reversible point-carrying bar separated therefrom.

Corresponding parts in the several figures are indicated by similar characters of reference.

The plow to which the improved device is attached for operation may be of any suitable kind and construction, and in the drawings a conventional bull-tongue plow has been shown having the beam 1, handles 2, and standard 3, which is slotted for the reception of the heel-bolt 4, whereby the bull-tongue 5 and the wings or scrapers 6 are connected with said standard. The wings or scrapers 6 are held in position securely by means of a special washer 7, having at its upper edge a central lug 8, extending into the slot of the standard and provided at its upper corners with lugs 9, engaging the upper edges of the wings, thereby holding said wings very securely against displacement when the device is in operation.

C designates the clamping device by means of which the fender attachment is connected with the plow-beam. Said clamping attachment includes a pair of plates 10 10, adapted to overlap each other underneath the plow-beam, each of said plates being provided at its outer edge with upturned lugs 11 and with downturned lugs 12, the latter being spaced apart, as shown, an intermediate lug or tongue being extended outwardly between said downwardly-extending lugs 12, while the lugs 11 are disposed, as shown, at the ends of the respective plates. The tongues 13 are provided with bolt-holes 14 for the reception of bolts 15, which pass through a clip-plate 16, lying across the top of the beam and having slots or perforations for the passage of the bolts.

B designates an angular or L-shaped bracket having a slot 17, which extends through both arms of said bracket, the upper horizontal arm being designated 18 and the lower approximately vertical arm being designated 19. It is obvious that in lieu of the slot 17, which is merely for the purpose of enabling the bracket B to be properly adjusted, said bracket may be provided with a plurality of bolt holes or perforations. This bracket is fitted against the under sides of the overlapping clamping-plates 10 10 between the downwardly-extending lugs 12 of the latter, and the bolts 15 are extended through the slot in the upper arm 18 of the bracket B, said bolts being provided with nuts 20, by tightening which the clamping device and the bracket B will be very firmly secured upon the plow-beam. It is obvious that owing to the presence of the slot 17 the lower arm 19 of the bracket may be adjusted at any desired distance laterally from the beam of the plow. It is also obvious that the clamping device may be readily adapted to beams of any size in such a manner as to fit tightly thereon and to insure the perfect and rigid attachment of the clamping device.

21 designates a fender beam or bar, the forward end of which is connected with the slotted arm 19 of the bracket B by means of a pair of rosettes 22 23, the inner one of which, 22, is provided with flanges 24, engaging the outer edges of the arm 19, while the inner rosette 23 has flanges 25 engaging the upper and lower edges of the beam 21 and a slotted shank 26, through which said beam extends. The engaging faces of the rosettes are provided in the usual manner with radial ribs or notches 27, engaging each other to prevent independent rotation of the rosettes, between which the beam 21 may thus be firmly secured by means of a single bolt 28 extending through central perforations 29 in the rosettes. The bolt 28 also extends through the slot 17 in the arm 19 and is provided with a nut 30, whereby it is firmly connected with the arm 19. It will be seen that by the construction described the beam 21 may be set by proper adjustment of the rosettes in such a manner as to raise or lower the rear end thereof to any desired extent. It will furthermore be seen that the beam and the rosettes are held securely against rotation by the flanges 24 engaging the edges of the arm 19, while by tightening the nut 30 the entire clamping device is secured very firmly against vertical displacement upon the arm 19. Thus while by means of the slotted bracket B the beam-carrying device may be set at any desired distance laterally from the plow-beam 1 the said beam-carrying device is capable of adjustment vertically by simply manipulating the nut 30, also that prior to such adjustment the rosettes may be relatively adjusted to secure any desired position of the rearwardly-extending beam 21.

To the inner side of the fender, near the front end of the latter, is detachably secured a bar 33, carrying at one end a cutter $33^a$, the lower or cutting end of which is preferably curved inwardly for the purpose of preventing the said cutter, which operates as a surplus-growth cutter, from injuring the roots of the plants operated upon. The opposite end of the bar 33 carries a point $33^b$, adapted to constitute a subsoiler. The bar 33, which carries the cutting members $33^a$ and $33^b$, may be formed integral with said cutting members, or the latter may be connected detachably with said bar in any suitable convenient manner, as illustrated in Fig. 9, where one end of said bar is shown to be bent to form a foot $33^f$, upon which the subsoiling-point is mounted. The subsoiler may be connected detachably with the fender—for instance, by means of a centrally-disposed nut-carrying bolt $33^c$—the bar being provided with perforations $33^d$, adapted to engage studs $33^e$, extending laterally from the body of the fender and adapted to engage the said perforations for the purpose of retaining the cutter-carrying bar 33 in adjusted position. To the inner side of the fender F is also secured an oblique inwardly and rearwardly extending bracket 34, to which an auxiliary wing 35 is attached, this wing 35 being disposed intermediately between the upper and lower edges of the fender, as will be readily seen.

The operation and advantages of this device as thus far described will be readily understood from the foregoing description, taken in connection with the drawings hereto annexed. It will be observed that the fender will at all times run parallel to the row of plants that are being operated upon; that it may be set or adjusted so as to operate successfully upon plants at various stages of their growth; that the front wing 35 will serve to remove from the ground adjacent to the plants any heavy obstructions, such as stones or clods, which by the subsequent action of the plow will be thrown aside to a position between the rows where their presence will not be injurious. In front of the wing 35 the subsoiler $33^b$ may be used to loosen and prepare the soil for the action of a cultivator-plow, or by reversing the bar 33 the surplus-growth cutter may be thrown into operation when desired. The wings or scrapers 6 will perform their function of throwing the loose dirt toward the plants, while the wing 32 is peculiarly curved, so that while clods and stones, loose grass, and other obstructions may not under any circumstances be thrown against the roots and stalks of the plants, the fine dirt will not be prevented from passing to a position contiguous to the plants, the healthy growth of which is thereby promoted.

In the accompanying drawings the improved fender attachment has been illustrated as being attached to the right-hand side of a plow-beam. It is to be understood, however, that it may equally well be made in left-hand pattern, so as to be attached to the left-hand side of the beam. Again, it may be found desirable to use in connection with a single plow two of the attachments, one being secured to each side of the beam, and the invention may likewise be applied to beams carrying more than one plow. In the latter case it is not essential that the attachment should be connected with the main plow or frame of the device, inasmuch as, for instance, in the case of riding-cultivators it may be connected with each of the individual cultivator-beams. In short, the right is reserved to apply and use the device in any manner and in connection with any cultivating or earth-engaging implements in connection with which it may be successfully employed.

In the foregoing description the improved attachment has been described as being constructed in such a manner that the fender-carrying beam, while capable of every needed adjustment, will be rigidly mounted in its adjusted position. By a slight modification (illustrated in Fig. 8 of the drawings) the fender-carrying beam may be connected pivotally with the arm 19, the modification consisting simply in omitting from the rosette 22 the flanges 24, engaging the edges of the arm 19, and employing suitably-disposed washers 36, which, while spacing the adjacent members properly apart, will admit of a free pivotal movement of the beam 21. In such case I prefer to connect with the rear end of the beam 21 a chain 37, a link of which may be connected with a supporting-hook 38 upon one of the handles of the plow, thus sustaining the rear end of the fender-carrying beam at any desired elevation chosen by the operator. I also prefer to provide the slotted arm 26, engaging the fender-carrying beam, with a threaded perforation 39, through which extends a set-screw 40, adapted to bear against the under side of the beam for the purpose of supporting the latter. This device may be used in connection with the supporting-chain.

Having thus described the invention, what is claimed is—

1. In a device of the class described, a clamping device including a pair of plates provided at their outer edges with pairs of upturned lugs, pairs of downturned lugs, and intermediately-disposed, outwardly-extending tongues, in combination with a plow-beam inserted between the upturned lugs of said clamping-plates, a transversely-disposed slotted bracket inserted between the downturned lugs of said clamping-plates, a transversely-disposed clip-plate, and connecting means.

2. The combination with a plow-beam, of a laterally-adjustable bracket, a beam connected with and vertically adjustable with relation to said bracket, a fender carried by said beam, and a wing secured to the inner side of said fender intermediate its upper and lower edges.

3. In a plow attachment of the class described, a laterally and vertically adjustable beam carrying a fender, and an inwardly-curved wing at the rear end of said fender.

4. In a plow attachment of the class described, a laterally and vertically adjustable beam, a fender carried by said beam, a subsoiler at the front end of said fender, and an oblique, inwardly-extending wing connected with said fender in rear of the subsoiler and intermediate the upper and lower edges of said fender.

5. In a plow attachment of the class described, a vertically and laterally adjustable fender-carrying beam, a subsoiler at the front end of the latter, an inwardly-curved wing at the rear end of said fender, an obliquely-disposed bracket intermediate the front and rear ends and upper and lower edges of the fender, and an auxiliary wing connected with said bracket.

6. In a plow attachment of the class described, a clamping device, an L-shaped bracket connected with the plow-beam by said clamping device, a beam-clamping device connected adjustably with the downwardly-extending arm of said bracket and including a member having a slotted arm, a fender-carrying beam extending through the slot of said arm, and a set-screw engaging a perforation in said arm and bearing against the lower edge of the fender-carrying beam.

7. In a plow attachment of the class described, the combination with a fender, of a bar connected reversibly and detachably therewith and provided at its opposite ends with ground-engaging points.

8. In a plow attachment of the class described, the combination of a fender, a bar connected reversibly and detachably with said fender and having a foot formed at one end thereof, and a subsoiling-point mounted upon said foot.

In testimony that I claim the foregoing as my own I have hereto affixed my signature in the presence of two witnesses.

WILLIAM F. EDWARDS.

Witnesses:
   A. D. MEADOR,
   J. H. CARROLL.